United States Patent
Handa et al.

(10) Patent No.: US 10,923,048 B2
(45) Date of Patent: Feb. 16, 2021

(54) DISPLAY DEVICE HAVING BACKLIGHT AND CONTROL METHOD THEREOF

(71) Applicant: SHARP KABUSHIKI KAISHA, Sakai (JP)

(72) Inventors: Takuya Handa, Sakai (JP); Kohichi Ohhara, Sakai (JP); Hideo Tohdoh, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 16/702,018

(22) Filed: Dec. 3, 2019

(65) Prior Publication Data

US 2020/0234658 A1    Jul. 23, 2020

Related U.S. Application Data

(60) Provisional application No. 62/793,510, filed on Jan. 17, 2019.

(51) Int. Cl.
| | |
|---|---|
| *G09G 3/34* | (2006.01) |
| *G09G 3/36* | (2006.01) |
| *F21V 8/00* | (2006.01) |
| *G02B 27/01* | (2006.01) |
| *H04N 13/344* | (2018.01) |

(52) U.S. Cl.
CPC .......... *G09G 3/342* (2013.01); *G02B 6/0051* (2013.01); *G02B 6/0073* (2013.01); *G02B 6/0078* (2013.01); *G02B 27/017* (2013.01); *G09G 3/3666* (2013.01); *H04N 13/344* (2018.05); *G09G 2310/024* (2013.01); *G09G 2310/0237* (2013.01)

(58) Field of Classification Search
CPC .... G09G 3/3406; G09G 3/342; G09G 3/3426; G02B 27/017; H04N 13/344
See application file for complete search history.

(56) References Cited

U.S. PATENT DOCUMENTS

| | | | | |
|---|---|---|---|---|
| 2007/0229487 | A1* | 10/2007 | Slavenburg | H04N 13/398 345/213 |
| 2009/0179850 | A1* | 7/2009 | Chen | G09G 3/003 345/102 |
| 2017/0351090 | A1* | 12/2017 | Sekiya | G02B 27/0189 |
| 2018/0197480 | A1* | 7/2018 | Choi | H04N 13/344 |
| 2020/0098324 | A1* | 3/2020 | Li | G09G 3/3611 |

FOREIGN PATENT DOCUMENTS

WO    2018/062016 A1    4/2018

* cited by examiner

*Primary Examiner* — Laurence J Lee
(74) *Attorney, Agent, or Firm* — ScienBiziP, P.C.

(57) ABSTRACT

In a display device including a display panel having two areas and a backlight having two light-emitting sections, a first scanning period, a first blanking period, a second scanning period, and a second blanking period are set sequentially in one frame period, scanning lines in a first area are selected sequentially in the first scanning period, the scanning lines in a second area are selected sequentially in the second scanning period, a second light-emitting section is made to turn on in a first turn-on period set in the first blanking period, and a first light-emitting section is made to turn on in a second turn-on period set in the second blanking period.

14 Claims, 6 Drawing Sheets

SELECTION ORDER
OF SCANNING LINES →

DISPLAY DEVICE HAVING BACKLIGHT AND CONTROL METHOD THEREOF

CROSS-REFERENCE TO RELATED APPLICATION

This application claims the benefit of U.S. Provisional Patent Application No. 62/793,510 filed on Jan. 17, 2019, and entitled "Display Device Having Backlight And Control Method Thereof", which is incorporated herein by reference in its entirety.

BACKGROUND OF THE INVENTION

Field of the Invention

The present invention relates to a display device, and more particularly relates to a display device having a backlight and a control method thereof.

Description of Related Art

Liquid crystal display devices are widely used as thin, light-weight, and low power consumption display devices. The liquid crystal display device is used also in a head mount display (hereinafter referred to as HMD), for example. In an HMD using a liquid crystal panel, by displaying a left eye image and a right eye image on the liquid crystal panel in a time division manner or in an area division manner, a user who puts on the HMD can see a three-dimensional image.

As a configuration method of the HMD, there are known a method of displaying the left eye image and the right eye image on two liquid crystal panels separately, and a method of displaying the left eye image and the right eye image on a left half and a right half of one liquid crystal panel, respectively. The latter method has advantages that cost is inexpensive, design is easy, and it is not necessary to take a difference in performances of the liquid crystal panels into consideration.

In the liquid crystal display device, an afterimage occurs when a moving picture is displayed. As a method for reducing the afterimage, there are known a method of performing an impulse drive of a backlight and a method of performing a scan drive of the backlight. The impulse drive is a method in which the backlight is made to turn on only in a turn-on period set in one frame period. The scan drive is a method in which the backlight is divided into a plurality of portions, and a portion to turn on is changed sequentially in one frame period.

Related to the invention of the present application, International Publication No. WO 2018/62016 discloses a display device which, when classifying a plurality of light sources included in a backlight into at least two groups, sets a boundary of the groups at a peripheral portion in a sequence of the light sources, and makes the light sources in the group turn on in a same period.

In the following, a liquid crystal display device which is built in the HMD for use and respectively displays the left eye image and the right eye image on the left half and the right half of one liquid crystal panel will be considered. When the liquid crystal display device performs the impulse drive, length of time from writing to a pixel circuit to turn-on of the backlight is different between the left half and the right half of the liquid crystal panel.

Thus, the liquid crystal display device performing the impulse drive may have a problem that display quality of the left eye image and that of the right eye image are different. This problem occurs also in a liquid crystal display device performing the scan drive. Furthermore, the liquid crystal display device performing the scan drive also has a problem that as a division number of the backlight is larger, a circuit amount of a backlight drive circuit and a number of wirings connecting the backlight and the backlight drive circuit are larger.

SUMMARY OF THE INVENTION

Therefore, providing a display device capable of suppressing a difference between display qualities of two images displayed on one display panel without increasing a circuit amount greatly is taken as a problem.

(1) A display device according to some embodiments of the present invention includes: a display panel including a plurality of scanning lines, a plurality of data lines, and a plurality of pixel circuits, and having a first area and a second area aligned in a same direction as the scanning lines; a backlight having a first light-emitting section corresponding to the first area and a second light-emitting section corresponding to the second area; a scanning line drive circuit configured to drive the scanning lines; a data line drive circuit configured to drive the data lines; and a backlight drive circuit configured to drive the backlight, a first scanning period, a first blanking period, a second scanning period, and a second blanking period are set sequentially in one frame period, the scanning line drive circuit is configured to select the scanning lines in the first area sequentially in the first scanning period, and to select the scanning lines in the second area sequentially in the second scanning period, and the backlight drive circuit is configured to make the second light-emitting section turn on in a first turn-on period set in the first blanking period, and to make the first light-emitting section turn on in a second turn-on period set in the second blanking period.

According to the above display device, by setting two blanking periods in one frame period and waiting in a blanking period for a response of the pixel circuit to which writing is performed in a previous scanning period, a difference between display quality of an image displayed in the first area and that of an image displayed in the second area can be suppressed. Furthermore, a circuit amount of the backlight and the backlight drive circuit is smaller than that in a case where a scan drive with a large division number of the backlight is performed. Therefore, the difference between the display qualities of the two images displayed on one display panel can be suppressed without increasing the circuit amount greatly.

(2) The display device according to some embodiments of the present invention has the configuration of above (1), a response of the pixel circuit in the first area finishes before the first light-emitting section turns on, and the response of the pixel circuit in the second area finishes before the second light-emitting section turns on.

(3) The display device according to some embodiments of the present invention has the configuration of above (1), the backlight has an edge type configuration including a light guide plate having a portion included in the first light-emitting section and a portion included in the second light-emitting section, a plurality of first light-emitting elements included in the first light-emitting section, and a plurality of second light-emitting elements included in the second light-emitting section, and the backlight drive circuit is configured to make the second light-emitting elements turn on in the first turn-on period, and to make the first light-emitting elements turn on in the second turn-on period.

(4) The display device according to some embodiments of the present invention has the configuration of above (1), the first light-emitting section has an edge type configuration including a first light guide plate and a plurality of first light-emitting elements, the second light-emitting section has an edge type configuration including a second light guide plate and a plurality of second light-emitting elements, independently of the first light-emitting section, and the backlight drive circuit is configured to make the second light-emitting elements turn on in the first turn-on period, and to make the first light-emitting elements turn on in the second turn-on period.

(5) The display device according to some embodiments of the present invention has the configuration of above (1), the backlight has a direct type configuration including a diffusion plate having a portion included in the first light-emitting section and a portion included in the second light-emitting section, and a plurality of light-emitting elements having a portion included in the first light-emitting section and a remainder included in the second light-emitting section, and the backlight drive circuit is configured to make the light-emitting elements included in the second light-emitting section turn on in the first turn-on period, and to make the light-emitting elements included in the first light-emitting section turn on in the second turn-on period.

(6) The display device according to some embodiments of the present invention has the configuration of above (1), and the display panel is a liquid crystal panel.

(7) The display device according to some embodiments of the present invention has the configuration of above (1), and the backlight includes a plurality of light emitting diodes.

(8) A control method of a display device according to some embodiments of the present invention is a control method of a display device having a display panel including a plurality of scanning lines, a plurality of data lines, and a plurality of pixel circuits, and having a first area and a second area aligned in a same direction as the scanning lines, and a backlight including a first light-emitting section corresponding to the first area and a second light-emitting section corresponding to the second area, the method includes steps of: setting a first scanning period, a first blanking period, a second scanning period, and a second blanking period sequentially in one frame period; selecting the scanning lines in the first area sequentially in the first scanning period, and selecting the scanning lines in the second area sequentially in the second scanning period; driving the data lines, and driving the backlight by making the second light-emitting section turn on in a first turn-on period set in the first blanking period, and making the first light-emitting section turn on in a second turn-on period set in the second blanking period.

According to the above control method of the display device, same effects as the display device having the configuration of above (1) can be obtained.

(9) The control method of the display device according to some embodiments of the present invention has the configuration of above (8), a response of the pixel circuit in the first area finishes before the first light-emitting section turns on, and the response of the pixel circuit in the second area finishes before the second light-emitting section turns on.

(10) The control method of the display device according to some embodiments of the present invention has the configuration of above (8), the backlight has an edge type configuration including a light guide plate having a portion included in the first light-emitting section and a portion included in the second light-emitting section, a plurality of first light-emitting elements included in the first light-emitting section, and a plurality of second light-emitting elements included in the second light-emitting section, and in driving the backlight, the second light-emitting elements are made to turn on in the first turn-on period, and the first light-emitting elements are made to turn on in the second turn-on period.

(11) The control method of the display device according to some embodiments of the present invention has the configuration of above (8), the first light-emitting section has an edge type configuration including a first light guide plate and a plurality of first light-emitting elements, the second light-emitting section has an edge type configuration including a second light guide plate and a plurality of second light-emitting elements, independently of the first light-emitting section, and in driving the backlight, the second light-emitting elements are made to turn on in the first turn-on period, and the first light-emitting elements are made to turn on in the second turn-on period.

(12) The control method of the display device according to some embodiments of the present invention has the configuration of above (8), the backlight has a direct type configuration including a diffusion plate having a portion included in the first light-emitting section and a portion included in the second light-emitting section, and a plurality of light-emitting elements having a portion included in the first light-emitting section and a remainder included in the second light-emitting section, and in driving the backlight, the light-emitting elements included in the second light-emitting section are made to turn on in the first turn-on period, and the light-emitting elements included in the first light-emitting section are made to turn on in the second turn-on period.

(13) The control method of the display device according to some embodiments of the present invention has the configuration of above (8), and the display panel is a liquid crystal panel.

(14) The control method of the display device according to some embodiments of the present invention has the configuration of above (8), and the backlight includes a plurality of light emitting diodes.

These and other objects, features, modes and effects of the present invention will be more apparent from the following detailed description with reference to the attached drawings.

DETAILED DESCRIPTION OF THE INVENTION

First Embodiment

Figure 1:
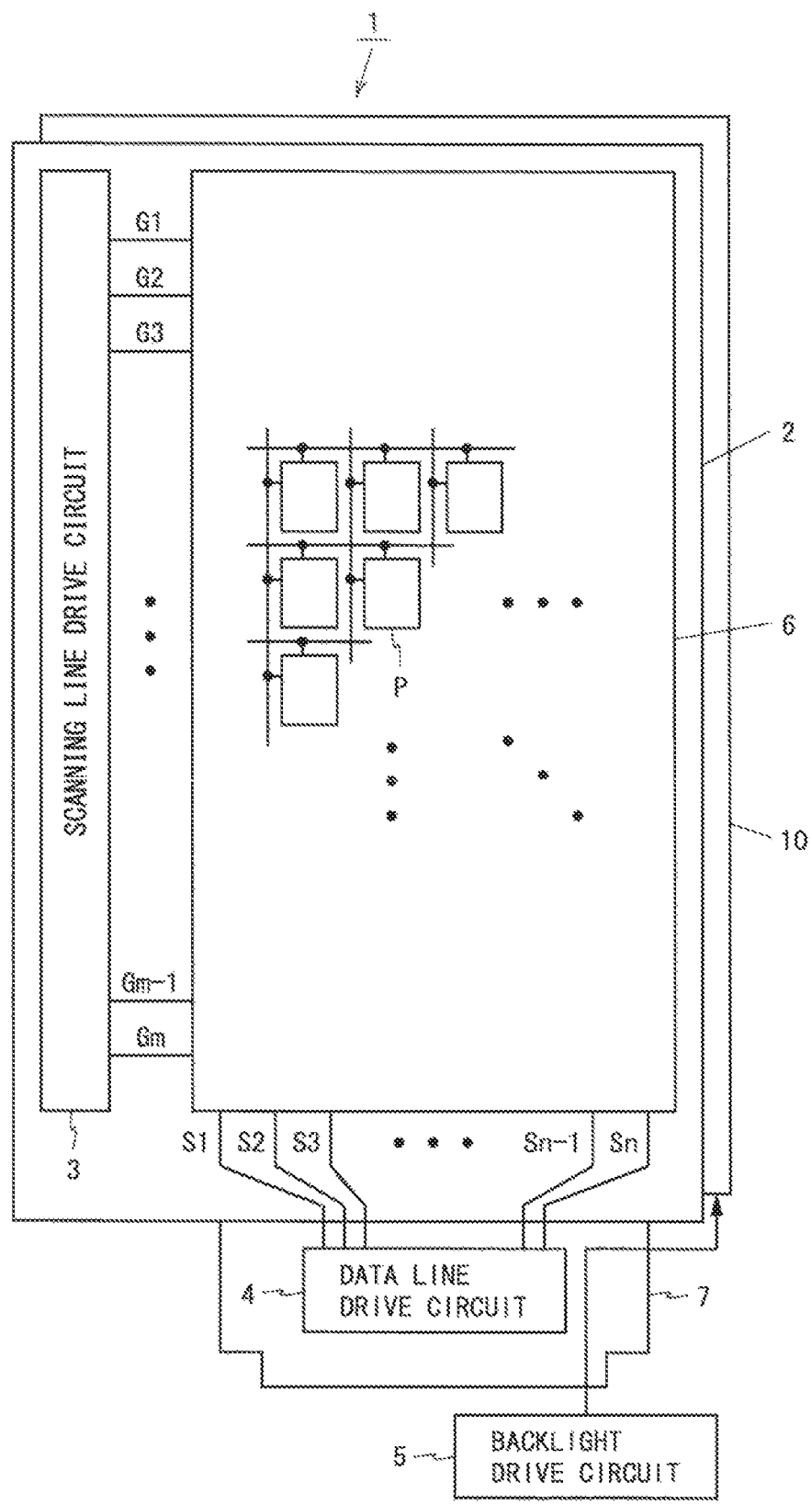
FIG. 1 is a block diagram showing a configuration of a liquid crystal display device according to a first embodiment.

FIG. 1 is a block diagram showing a configuration of a liquid crystal display device according to a first embodiment. A liquid crystal display device 1 shown in FIG. 1 includes a liquid crystal panel 2, a scanning line drive circuit 3, a data line drive circuit 4, a backlight drive circuit 5, and a backlight 10. Hereinafter, it is assumed that m and n are integers not less than 2.

The liquid crystal panel 2 has a display section 6. The display section 6 includes m scanning lines G1 to Gm, n data lines S1 to Sn, and (m×n) pixel circuits P. The scanning lines G1 to Gm are arranged in parallel with each other. The data lines S1 to Sn are arranged in parallel with each other so as to intersect with the scanning lines G1 to Gm perpendicularly. The scanning lines G1 to Gm and the data lines S1 to Sn intersect at (m×n) points. The (m×n) pixel circuits P are arranged corresponding to (m×n) intersections of the scanning lines G1 to Gm and the data lines S1 to Sn, respectively.

The scanning line drive circuit 3 is formed on the liquid crystal panel 2 together with the pixel circuits P and the like (gate driver monolithic configuration). The data line drive circuit 4 is mounted on a flexible printed circuit board 7 connected to the liquid crystal panel 2 (chip on film configuration). The backlight drive circuit 5 is provided on a host device (not shown) connected to the liquid crystal panel 2 via the flexible printed circuit board 7. Note that the scanning line drive circuit 3, the data line drive circuit 4, and the backlight drive circuit 5 may be implemented in styles other than the above.

The backlight drive circuit 5 drives the backlight 10. The backlight 10 is provided on a back surface side of the liquid crystal panel 2, and irradiates a back surface of the liquid crystal panel 2 with light. The scanning line drive circuit 3 drives the scanning lines G1 to Gm, and the data line drive circuit 4 drives the data lines S1 to Sn. More specifically, the scanning line drive circuit 3 selects the scanning lines G1 to Gm sequentially based on a control signal output from a display control circuit (not shown). With this, the pixel circuits P in one row are selected sequentially. The data line drive circuit 4 respectively applies, to the data lines S1 to Sn, n voltages in accordance with a video signal (not shown) supplied from the host device. With this, the n voltages are written to the selected pixel circuits P in one row. The pixel circuit P corresponds to a pixel, and brightness of the pixel changes in accordance with the voltage written to the pixel circuit P.

The liquid crystal panel 2 has a shape in which a side parallel to the data lines S1 to Sn (side in a vertical direction in FIG. 1) is longer than a side parallel to the scanning lines G1 to Gm (side in a horizontal direction in FIG. 1). In a normal state, the liquid crystal display device 1 is used in a state (portrait mode) where the liquid crystal panel 2 has a longer vertical side, as shown FIG. 1. When built in an HMD and displaying a three-dimensional image, the liquid crystal display device 1 is used in a state (landscape mode) where the liquid crystal panel 2 has a longer horizontal side.

Figure 2:
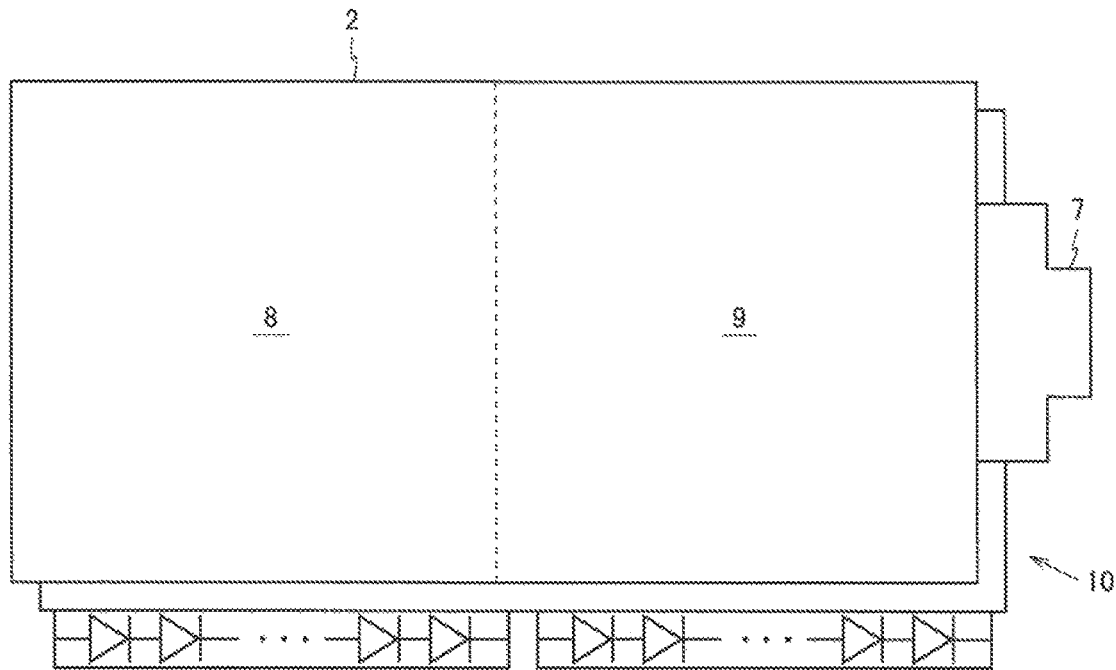
FIG. 2 is a diagram showing a usage status of the liquid crystal display device shown in FIG. 1.

FIG. 2 is a diagram showing a usage status of the liquid crystal display device 1 when displaying the three-dimensional image. FIG. 2 describes some components of the liquid crystal display device 1. When displaying the three-dimensional image, the liquid crystal display device 1 is used in a state shown in FIG. 2, in which the device is rotated counterclockwise by 90 degrees from the state shown in FIG. 1. The scanning lines G1 to Gm are selected in an order shown by an arrow in FIG. 2. The liquid crystal panel 2 is divided into two areas (a left eye area 8 and a right eye area 9) aligned in a same direction as the scanning lines G1 to Gm (aligned left and right in FIG. 2). A user can see the three-dimensional image by displaying a left eye image in the left eye area 8 and displaying a right eye image in the right eye area 9.

Figure 3:
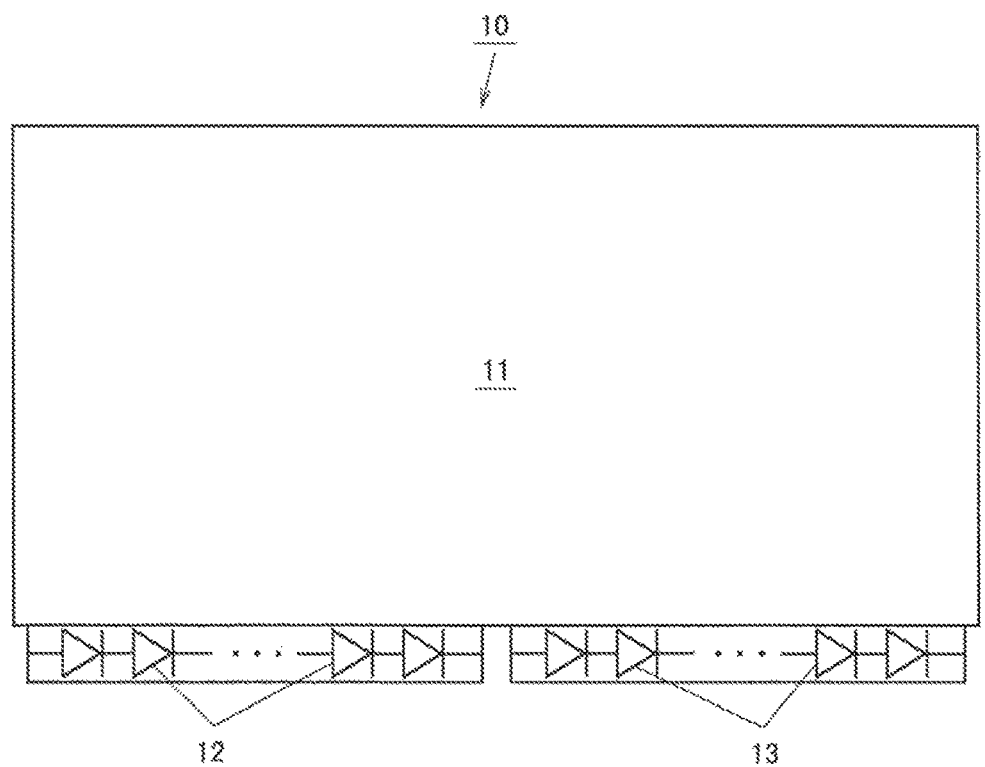
FIG. 3 is a diagram showing a configuration of a backlight of the liquid crystal display device shown in FIG. 1.

FIG. 3 is a diagram showing a configuration of the backlight 10. The backlight 10 shown in FIG. 3 has an edge type configuration including a light guide plate 11, a plurality of LEDs (Light Emitting Diodes) 12, and a plurality of LEDs 13. The light guide plate 11 is provided corresponding to an entire surface of the liquid crystal panel 2. The plurality of LEDs 12 are connected in series and are arranged along one side surface of a left half of the light guide plate 11 (side surface depicted downward in FIG. 3). The plurality of LEDs 13 are connected in series and are arranged along one side surface of a right half of the light guide plate 11 (side surface depicted downward in FIG. 3). The backlight drive circuit 5 makes the plurality of LEDs 12 and the plurality of LEDs 13 turn on in periods different from each other. Thus, a left half of the backlight 10 and a right half of the backlight 10 turn on in the periods different from each other.

In the liquid crystal display device 1, the left eye area 8 and the right eye area 9 function as a first area and a second area, respectively. The LEDs 12, 13 function as a first light-emitting element and a second light-emitting element, respectively. The left half of the backlight 10 including the left half of the light guide plate 11 and the plurality of LEDs 12 function as a first light-emitting section. The right half of the backlight 10 including the right half of the light guide plate 11 and the plurality of LEDs 13 function as a second light-emitting section.

Figure 4:
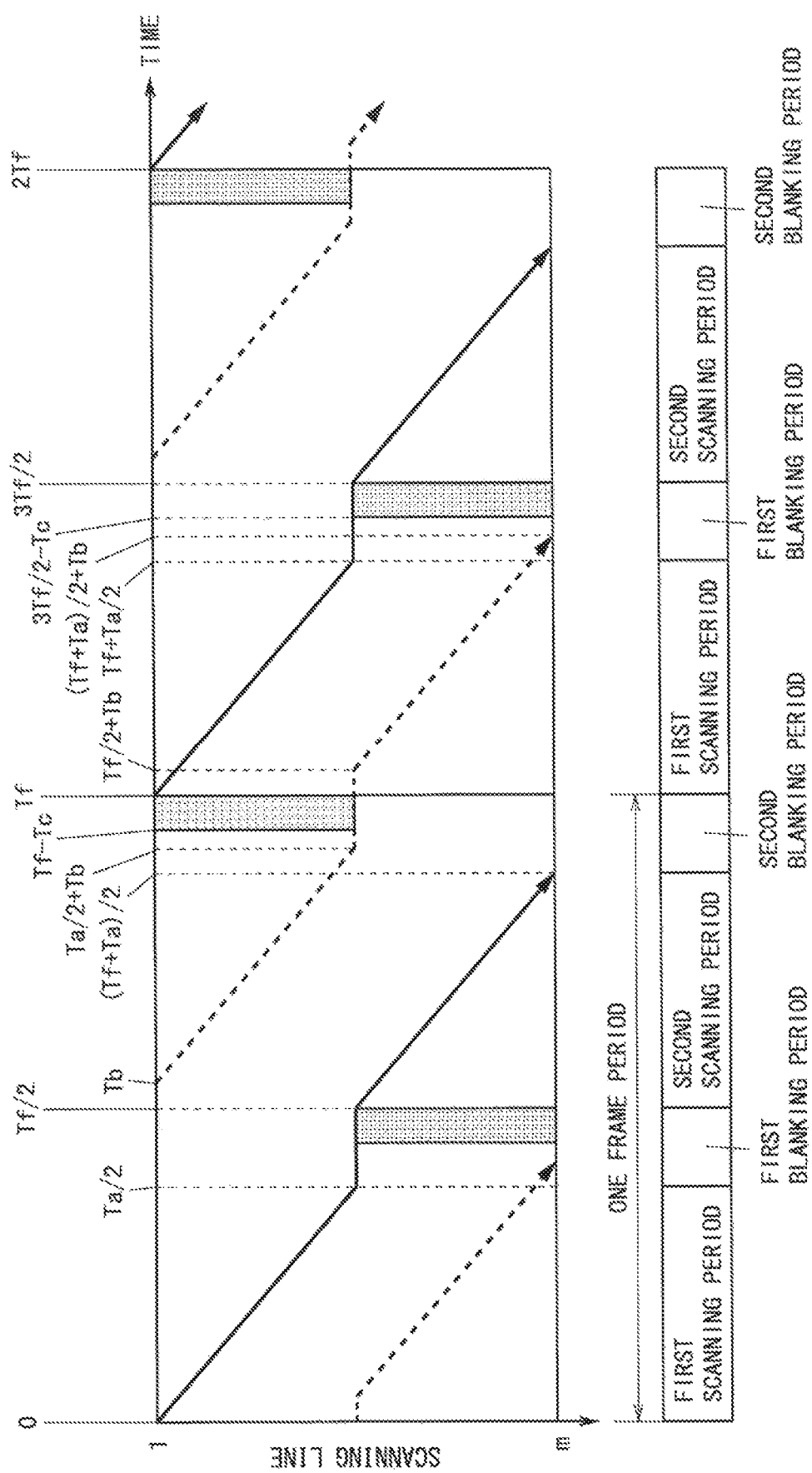
FIG. 4 is a timing chart of the liquid crystal display device shown in FIG. 1.

FIG. 4 is a timing chart of the liquid crystal display device 1. In FIG. 4, a horizontal axis represents time and a vertical axis represents an index of the scanning line. A solid arrow represents a timing at which the scanning line is selected (timing at which writing to the pixel circuit P connected to the scanning line is performed), and a dashed arrow represents a timing at which a response (response of liquid crystal) of the pixel circuit P connected to the scanning line finishes. A dot pattern portion represents a turn-on portion and a turn-on period of the backlight 10.

In the following, it is assumed that length of one frame period is Tf, time required by the scanning line drive circuit 3 to select all of the scanning lines G1 to Gm is Ta, response time of the pixel circuit P (response speed of liquid crystal) is Tb, and length of the turn-on period of the backlight 10 is Tc. For example, when a frame frequency is 90 Hz, a scanning speed is 120 Hz, and the response speed of the liquid crystal is 6 ms, Tf=11.1 ms, Ta=8.3 ms, and Tb=6 ms.

As shown in FIG. 4, in the liquid crystal display device 1, a first scanning period, a first blanking period, a second scanning period, and a second blanking period are set sequentially in one frame period. A first turn-on period is set in the first blanking period, and a second turn-on period is set in the second blanking period. The first turn-on period is set at the tail of the first blanking period, and the second turn-on period is set at the tail of the second blanking period. Lengths of the first and second scanning periods are Ta/2, lengths of the first and second blanking periods are (Tf−Ta)/2, and lengths of the first and second turn-on periods are Tc.

The scanning line drive circuit 3 selects the scanning lines G1 to Gm/2 in the left eye area 8 in an ascending order in the first scanning period, selects the scanning lines Gm/2+1 to Gm in the right eye area 9 in the ascending order in the second scanning period, and suspends selecting the scanning lines G1 to Gm in the first and second blanking periods. Writing to the pixel circuits P in the left eye area 8 is performed sequentially (left-to-right order in FIG. 2) in the first scanning period, and writing to the pixel circuits P in the right eye area 9 is performed sequentially (left-to-right order in FIG. 2) in the second scanning period.

The backlight drive circuit 5 makes only the plurality of LEDs 13 turn on in the first turn-on period in the first blanking period, makes only the plurality of LEDs 12 turn on in the second turn-on period in the second blanking period, and makes the plurality of LEDs 12 and the plurality of LEDs 13 turn off in other periods. The right half of the backlight 10 (portion corresponding to the right eye area 9) turns on in the first turn-on period, and the left half of the backlight 10 (portion corresponding to the left eye area 8) turns on in the second turn-on period.

The liquid crystal display device 1 is configured so that the response of the pixel circuit P in the left eye area 8 finishes before the plurality of LEDs 12 turn on, and the response of the pixel circuit P in the right eye area 9 finishes before the plurality of LEDs 13 turn on.

Figure 5:
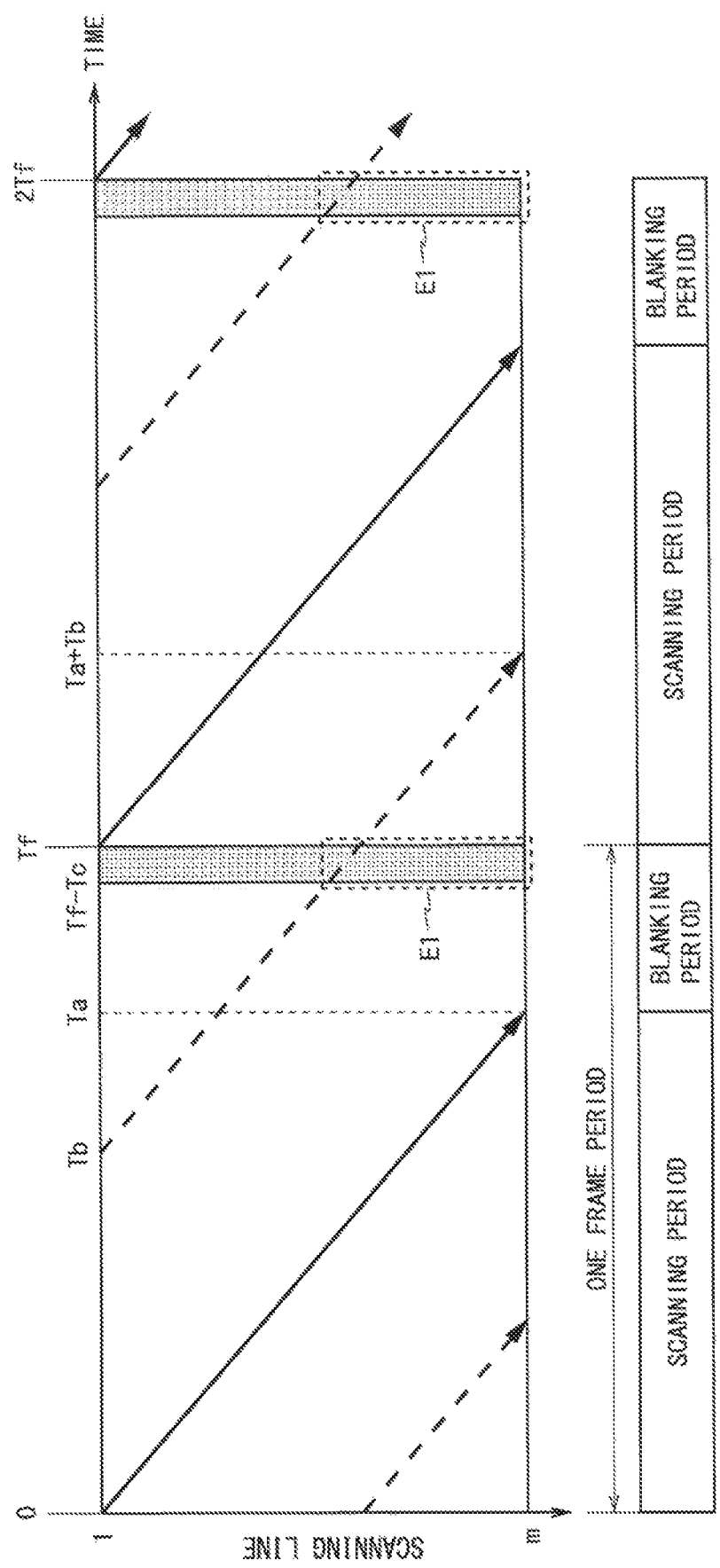
FIG. 5 is a timing chart of a conventional liquid crystal display device performing an impulse drive.
Figure 6:
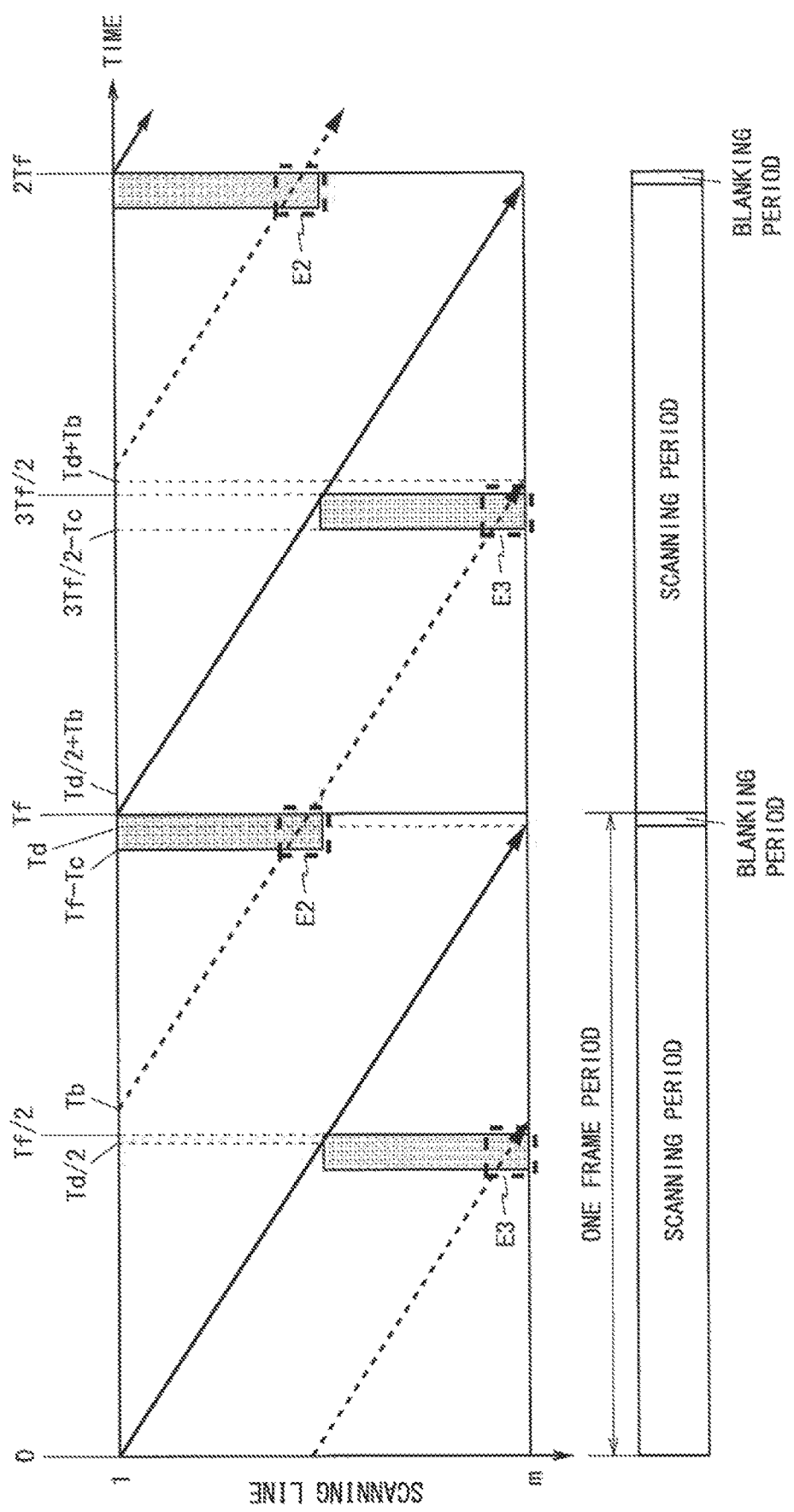
FIG. 6 is a timing chart of a conventional liquid crystal display device performing a scan drive with dividing into two.

FIG. 5 is a timing chart of a conventional liquid crystal display device performing an impulse drive. FIG. 6 is a timing chart of a conventional liquid crystal display device performing a scan drive with dividing into two. With reference to FIGS. 4 to 6, effects of the liquid crystal display device 1 according to the present embodiment will be described. In the following, the pixel circuit P connected to a scanning line Gi (i is an integer not less than 1 and not more than m) is referred to as the pixel circuit in an i-th row, and it is assumed that a start time of one frame period is time 0.

In the liquid crystal display device performing the impulse drive (FIG. 5), writing to the pixel circuit in a first row is performed at the time 0, and writing to the pixel circuit in an m-th row is performed at time Ta (see solid arrow). Since the response time of the pixel circuit is Tb, the response of the pixel circuit in the first row finishes at time Tb, and the response of the pixel circuit in the m-th row finishes at time (Ta+Tb) (see dashed arrow). The backlight turns on in a period from time (Tf−Tc) to time Tf.

When Tf−Tc<Ta+Tb is satisfied, the backlight turns on before the responses of some pixel circuits included in the right half (right eye area) of the liquid crystal panel finish. Thus, an afterimage occurs in an E1 portion shown in FIG. 5. The afterimage occurs only in the right eye area. Thus, when the liquid crystal display device performing the impulse drive in accordance with the timing chart shown in FIG. 5 displays a three-dimensional image, display quality of the three-dimensional image deteriorates, because display quality of the left eye image and that of the right eye image are different.

In the liquid crystal display device performing the scan drive with dividing into two (FIG. 6), it is assumed that time required by the scanning line drive circuit to select all of the scanning lines G1 to Gm is Td. In the liquid crystal display device, writing to the pixel circuit in the first row is performed at the time 0, writing to the pixel circuit in an m/2-th row is performed at time Td/2, and writing to the pixel circuit in the m-th row is performed at time Td (see solid arrow). The response of the pixel circuit in the first row finishes at the time Tb, the response of the pixel circuit in the m/2-th row finishes at time (Td/2+Tb), and the response of the pixel circuit in the m-th row finishes at time (Td+Tb) (see dashed arrow). The left half of the backlight turns on in a period from the time (Tf−Tc) to the time Tf, and the right half of the backlight turns on in a period from time (3Tf/2−Tc) to time 3Tf/2.

When Tf−Tc<Td/2+Tb is satisfied, the left half of the backlight turns on before the responses of some pixel circuits included in the left half (left eye area) of the liquid crystal panel finish. Thus, an afterimage occurs in an E2 portion shown in FIG. 6. Furthermore, when 3Tf/2−Tc<Td+Tb is satisfied, the right half of the backlight turns on before the responses of some pixel circuits included in the right half (right eye area) of the liquid crystal panel finish. Thus, an afterimage occurs in an E3 portion shown in FIG. 6. A range and a degree of the afterimage which occurs in the left eye area are different from those of the afterimage which occurs in the right eye area. Thus, when the liquid crystal display device performing the scan drive with dividing into two in accordance with the timing chart shown in FIG. 6 displays a three-dimensional image, display quality of the three-dimensional image deteriorates, because display quality of the left eye image and that of the right eye image are different.

In the liquid crystal display device 1 according to the present embodiment (FIG. 4), writing to the pixel circuit P in the first row is performed at the time t0, writing to the pixel circuit P in the m/2-th row is performed at time Ta/2, writing to the pixel circuit P in an (m/2+1)-th row is performed at time Tf/2, and writing to the pixel circuit P in the m-th row is performed at time (Tf+Ta)/2 (see solid arrow). The response of the pixel circuit P in the first row finishes at the time Tb, the response of the pixel circuit in the m/2-th row finishes at time (Ta/2+Tb), the response of the pixel circuit P in the (m/2+1)-th row finishes at time (Tf/2+Tb), and the response of the pixel circuit P in the m-th row finishes at time {(Tf+Ta)/2+Tb}(see dashed arrow). The left half of the backlight 10 turns on in a period from the time (Tf−Tc) to time Tc, and the right half of the backlight 10 turns on in a period from the time (3Tf/2−Tc) to the time 3Tf/2.

As described above, in the liquid crystal display device 1, the response of the pixel circuit P in the left eye area 8 finishes before the plurality of LEDs 12 turn on, and the response of the pixel circuit P in the right eye area 9 finishes before the plurality of LEDs 13 turn on. That is, both Ta/2+Tb<Tf−Tc and (Tf+Ta)/2+Tb<3Tf/2−Tc are satisfied. Thus, the afterimage caused because the backlight 10 turns on before the response of the pixel circuit P finishes does not occur in the liquid crystal display device 1. Therefore, when the liquid crystal display device 1 displays the three-dimensional image, the difference between the display quality of the left eye image and that of the right eye image can be suppressed, and deterioration of display quality of the three-dimensional image can be prevented.

As described above, the liquid crystal display device 1 according to the present embodiment includes a display panel (liquid crystal panel 2) including the plurality of scanning lines G1 to Gm, the plurality of data lines S1 to Sn, and the plurality of pixel circuits P, and having the first area (left eye area 8) and the second area (right eye area 9) aligned in a same direction as the scanning lines G1 to Gm, the backlight 10 having the first light-emitting section (left half) corresponding to the first area and the second light-emitting section (right half) corresponding to the second area, the scanning line drive circuit 3 which drives the scanning lines G1 to Gm, the data line drive circuit 4 which drives the data lines S1 to Sn, and the backlight drive circuit 5 which drives the backlight 10. In the display device, the first scanning period, the first blanking period, the second scanning period, and the second blanking period are set sequentially in one frame period. The scanning line drive circuit 3 selects the scanning lines G1 to Gm/2 in the first area sequentially in the first scanning period, and selects the scanning lines Gm/2+1 to Gm in the second area sequentially in the second scanning period, and the backlight drive circuit 5 makes the second light-emitting section turn on in the first turn-on period set in the first blanking period, and makes the first light-emitting section turn on in the second turn-on period set in the second blanking period.

Therefore, according to the liquid crystal display device 1, by setting two blanking periods in one frame period and waiting in a blanking period for the response of the pixel circuit P to which writing is performed in a previous scanning period, a difference between display quality of an image (left eye image) displayed in the first area and that of an image (right eye image) displayed in the second area can be suppressed. Furthermore, a circuit amount of the backlight 10 and the backlight drive circuit 5 is smaller than that in a case where the scan drive with a large division number of the backlight is performed. Therefore, the difference between the display qualities of the two images displayed on one display panel can be suppressed without increasing the circuit amount greatly.

Furthermore, in the liquid crystal display device 1, the response of the pixel circuit P in the first area finishes before the first light-emitting section turns on, and the response of the pixel circuit P in the second area finishes before the second light-emitting section turns on. Therefore, the afterimage caused because the backlight 10 turns on before the response of the pixel circuit P finishes does not occur in the liquid crystal display device 1. Therefore, when the liquid crystal display device 1 displays the three-dimensional image, a difference between display quality of the left eye image and that of the right eye image can be suppressed, and deterioration of display quality of the three-dimensional image can be prevented.

Furthermore, the backlight 10 has the edge type configuration including the light guide plate 11 having a portion (left half) included in the first light-emitting section and a portion (right half) included in the second light-emitting section, a plurality of first light-emitting elements (LEDs 12) included in the first light-emitting section, and a plurality of second light-emitting elements (LEDs 13) included in the second light-emitting section, and the backlight drive circuit 5 makes the second light-emitting elements turn on in the first turn-on period, and makes the first light-emitting elements turn on in the second turn-on period. Therefore, the backlight 10 can be configured easily using one piece of the light guide plate 11 and the plurality of light-emitting elements.

Second Embodiment

A liquid crystal display device according to a second embodiment has the same configuration (FIG. 1) as the liquid crystal display device 1 according to the first embodiment, and operates with the same timing (FIG. 4) as the liquid crystal display device 1. The liquid crystal display device according to the present embodiment includes a backlight shown below in place of the backlight 10. In the following, differences from the first embodiment will be described.

Figure 7:
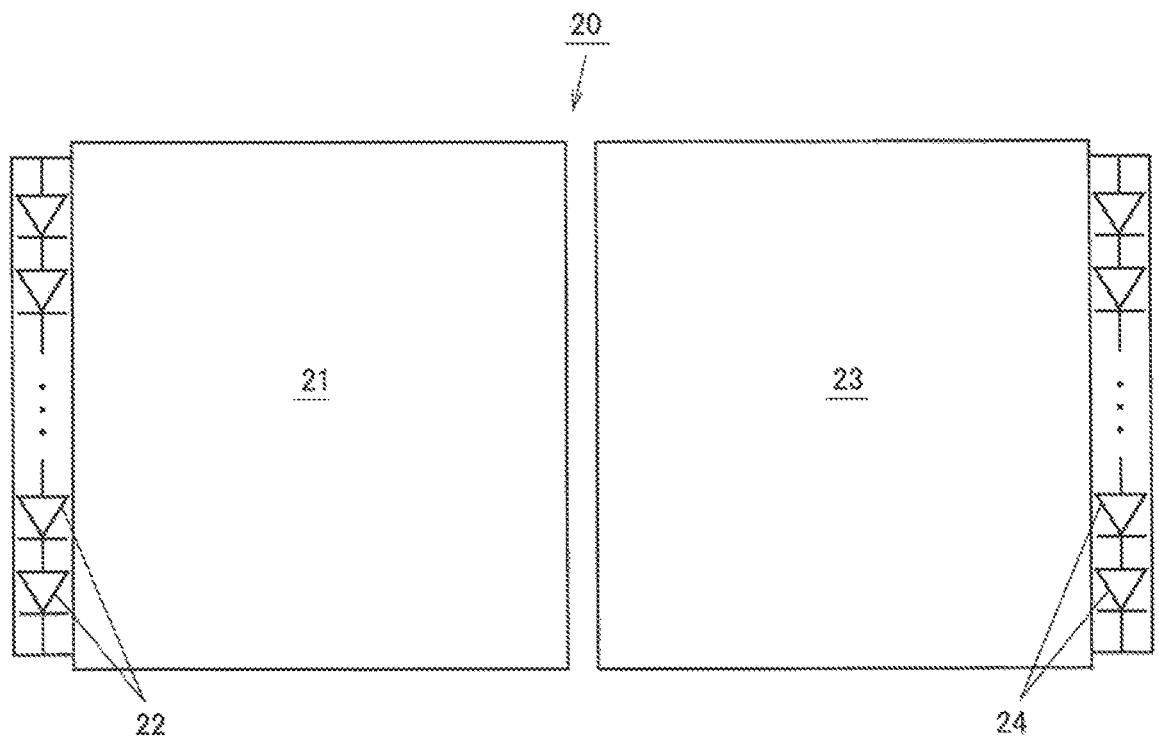
FIG. 7 is a diagram showing a configuration of a backlight of a liquid crystal display device according to a second embodiment.

FIG. 7 is a diagram showing a configuration of s backlight of the liquid crystal display device according to the present embodiment. A backlight 20 shown in FIG. 7 includes a light guide plate 21, a plurality of LEDs 22, a light guide plate 23, and a plurality of LEDs 24. The light guide plate 21 is provided corresponding to a left half of the liquid crystal panel 2. The plurality of LEDs 22 are connected in series and are arranged along one side surface of the light guide plate 21 (side surface depicted leftward in FIG. 7). The light guide plate 21 and the plurality of LEDs 22 function as a first light-emitting section having an edge type configuration. The light guide plate 23 is provided corresponding to a right half of the liquid crystal panel 2. The plurality of LEDs 24 are connected in series and are arranged along one side surface of the light guide plate 23 (side surface depicted rightward in FIG. 7). The light guide plate 23 and the plurality of LEDs 24 function as a second light-emitting section having an edge type configuration, independently of the first light-emitting section.

In accordance with the timing chart shown in FIG. 4, the backlight drive circuit 5 makes the plurality of LEDs 24 turn on in the first turn-on period, and makes the plurality of LEDs 22 turn on in the second turn-on period. Thus, a right half of the backlight 20 turns on in the first turn-on period, and a left half of the backlight 20 turns on in the second turn-on period.

The light guide plates 21, 23 respectively function as first and second light guide plates, and the LEDs 22, 24 respectively function as first and second light-emitting elements. The left half of the backlight 20 including the light guide plate 21 and the plurality of LEDs 22 functions as the first light-emitting section. The right half of the backlight 20 including the light guide plate 23 and the plurality of LEDs 24 functions as the second light-emitting section. Also according to the liquid crystal display device including the backlight 20, as with the first embodiment, the difference between the display qualities of the two images displayed on one display panel can be suppressed without increasing the circuit amount greatly.

In the liquid crystal display device according to the present embodiment, the first light-emitting section has the edge type configuration including a first light guide plate (light guide plate 21) and a plurality of first light-emitting elements (LEDs 22), the second light-emitting section has the edge type configuration including a second light guide plate (light guide plate 23) and a plurality of second light-emitting elements (LEDs 24), independently of the first light-emitting section, and the backlight drive circuit 5 makes the second light-emitting elements turn on in the first turn-on period, and makes the first light-emitting elements turn on in the second turn-on period. Therefore, the backlight 20 can be configured easily using two pieces of the light guide plates 21, 23 and the plurality of light-emitting elements. Furthermore, since the first light-emitting section and the second light-emitting section have independent configurations, light emitted from the first light-emitting elements and light emitted from the second light-emitting elements do not mix at a center portion of the backlight 20. Therefore, display quality of a center portion of a display panel (liquid crystal panel 2) can be further improved.

Third Embodiment

A liquid crystal display device according to a third embodiment has the same configuration (FIG. 1) as the liquid crystal display device 1 according to the first embodiment, and operates with the same timing (FIG. 4) as the liquid crystal display device 1. The liquid crystal display device according to the present embodiment includes a backlight shown below in place of the backlight 10. In the following, differences from the first embodiment will be described.

Figure 8:
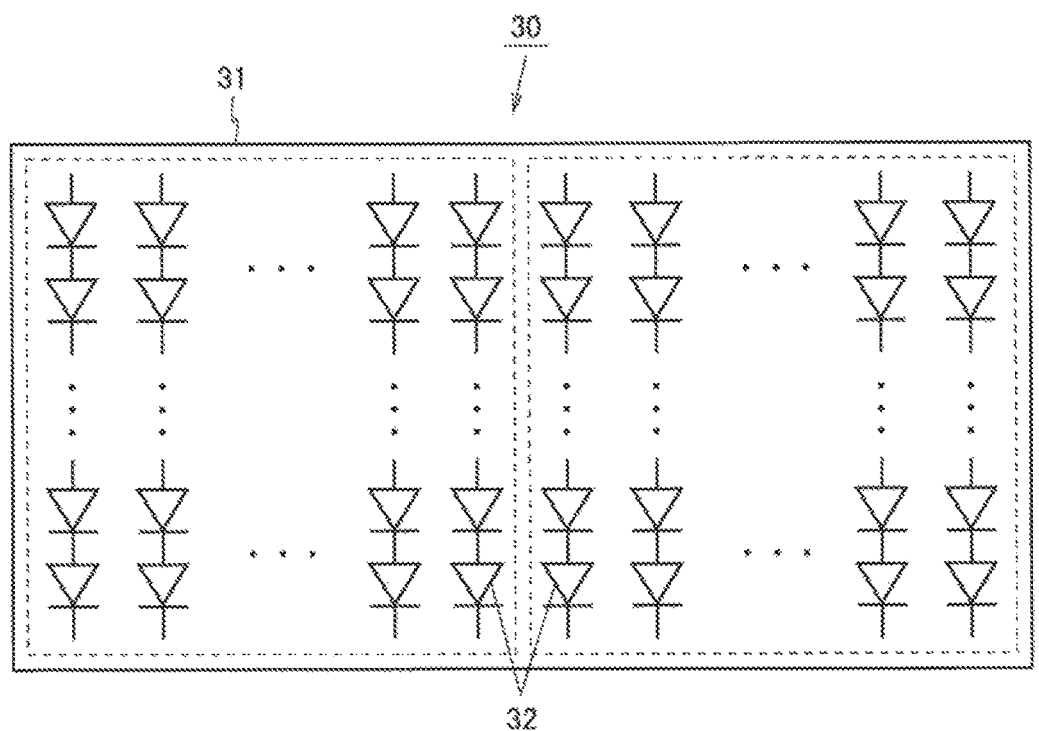
FIG. 8 is a diagram showing a configuration of a backlight of a liquid crystal display device according to a third embodiment.

FIG. 8 is a diagram showing a configuration of a backlight of the liquid crystal display device according to the present embodiment. A backlight 30 shown in FIG. 8 has a direct type configuration including a diffusion plate 31 and a plurality of LEDs 32. The diffusion plate 31 is provided corresponding to the entire surface of the liquid crystal panel 2. As the LED 32, a mini LED or a micro LED is used, for example. The plurality of LEDs 32 are arranged two-dimensionally corresponding to an entire surface of the diffusion plate 31, and are connected in series so that each connection includes a predetermined number of LEDs. The plurality of LEDs 32 are classified into those corresponding to a left half of the diffusion plate 31 (those depicted in a left dashed rectangle) and those corresponding to a right half of the diffusion plate 31 (those depicted in a right dashed rectangle).

In accordance with the timing chart shown in FIG. 4, the backlight drive circuit 5 makes the plurality of LEDs 32 corresponding to the right half of the diffusion plate 31 turn on in the first turn-on period, and makes the plurality of LEDs 32 corresponding to the left half of the diffusion plate 31 turn on in the second turn-on period. Thus, a right half of the backlight 30 turns on in the first turn-on period, and a left half of the backlight 30 turns on in the second turn-on period.

The plurality of LEDs 32 corresponding to the left half of the diffusion plate 31 function as first light-emitting elements, and the plurality of LEDs 32 corresponding to the right half of the diffusion plate 31 function as second light-emitting elements. The left half of the backlight 30 including the left half of the diffusion plate 31 and the plurality of LEDs 32 corresponding to the left half of the diffusion plate 31 function as a first light-emitting section. The right half of the backlight 30 including the right half of the diffusion plate 31 and the plurality of LEDs 32 corresponding to the right half of the diffusion plate 31 function as a second light-emitting section. Also according to the liquid crystal display device including the backlight 30, as with the first embodiment, the difference between the display qualities of the two images displayed on one display panel can be suppressed without increasing the circuit amount greatly.

In the liquid crystal display device according to the present embodiment, the backlight 30 has the direct type configuration including the diffusion plate 31 having a portion (left half) included in the first light-emitting section and a portion (right half) included in the second light-emitting section, and the plurality of light-emitting elements (LEDs 32) having a portion (LEDs corresponding to the left half of the diffusion plate 31) included in the first light-emitting section and a remainder (LEDs corresponding to the right half of the diffusion plate 31) included in the second light-emitting section, and the backlight drive circuit 5 makes the light-emitting elements included in the second light-emitting section turn on in the first turn-on period, and makes the light-emitting elements included in the first light-emitting section turn on in the second turn-on period. Therefore, the backlight 30 can be configured easily using one piece of the diffusion plate 31 and the plurality of light-emitting elements. Furthermore, a local dimming process (process in which brightness of the backlight is changed for each area in accordance with the video signal) can be performed using the direct type backlight 30.

Note that although the liquid crystal display devices are described in the first to third embodiments, display devices other than the liquid crystal display device having a backlight may be configured in a similar manner.

Although the present invention is described in detail in the above, the above description is exemplary in all of the aspects and is not restrictive. It is understood that various other changes and modification can be derived without going out of the present invention.

What is claimed is:

1. A display device comprising:
   a display panel including a plurality of scanning lines, a plurality of data lines, and a plurality of pixel circuits, and having a first area and a second area aligned in a same direction as the scanning lines;
   a backlight having a first light-emitting section corresponding to the first area and a second light-emitting section corresponding to the second area;
   a scanning line drive circuit configured to drive the scanning lines;
   a data line drive circuit configured to drive the data lines; and
   a backlight drive circuit configured to drive the backlight, wherein
   a first scanning period, a first blanking period, a second scanning period, and a second blanking period are set sequentially in one frame period,
   the scanning line drive circuit is configured to select the scanning lines in the first area sequentially in the first scanning period, and to select the scanning lines in the second area sequentially in the second scanning period, and
   the backlight drive circuit is configured to make the second light-emitting section turn on in a first turn-on period set in the first blanking period, and to make the first light-emitting section turn on in a second turn-on period set in the second blanking period.

2. The display device according to claim 1, wherein a response of the pixel circuit in the first area finishes before the first light-emitting section turns on, and the response of the pixel circuit in the second area finishes before the second light-emitting section turns on.

3. The display device according to claim 1, wherein
   the backlight has an edge type configuration including a light guide plate having a portion included in the first light-emitting section and a portion included in the second light-emitting section, a plurality of first light-emitting elements included in the first light-emitting section, and a plurality of second light-emitting elements included in the second light-emitting section, and
   the backlight drive circuit is configured to make the second light-emitting elements turn on in the first turn-on period, and to make the first light-emitting elements turn on in the second turn-on period.

4. The display device according to claim 1, wherein
   the first light-emitting section has an edge type configuration including a first light guide plate and a plurality of first light-emitting elements,
   the second light-emitting section has an edge type configuration including a second light guide plate and a plurality of second light-emitting elements, independently of the first light-emitting section, and the backlight drive circuit is configured to make the second light-emitting elements turn on in the first turn-on period, and to make the first light-emitting elements turn on in the second turn-on period.

5. The display device according to claim 1, wherein the backlight has a direct type configuration including a diffusion plate having a portion included in the first light-emitting section and a portion included in the second light-emitting section, and a plurality of light-emitting elements having a portion included in the first light-emitting section and a remainder included in the second light-emitting section, and the backlight drive circuit is configured to make the light-emitting elements included in the second light-emitting section turn on in the first turn-on period, and to make the light-emitting elements included in the first light-emitting section turn on in the second turn-on period.

6. The display device according to claim 1, wherein the display panel is a liquid crystal panel.

7. The display device according to claim 1, wherein the backlight includes a plurality of light emitting diodes.

8. A control method of a display device having a display panel including a plurality of scanning lines, a plurality of data lines, and a plurality of pixel circuits, and having a first area and a second area aligned in a same direction as the scanning lines, and a backlight including a first light-emitting section corresponding to the first area and a second light-emitting section corresponding to the second area, the method comprising steps of:

setting a first scanning period, a first blanking period, a second scanning period, and a second blanking period sequentially in one frame period;

selecting the scanning lines in the first area sequentially in the first scanning period, and selecting the scanning lines in the second area sequentially in the second scanning period;

driving the data lines, and driving the backlight by making the second light-emitting section turn on in a first turn-on period set in the first blanking period, and making the first light-emitting section turn on in a second turn-on period set in the second blanking period.

9. The control method of the display device according to claim 8, wherein a response of the pixel circuit in the first area finishes before the first light-emitting section turns on, and the response of the pixel circuit in the second area finishes before the second light-emitting section turns on.

10. The control method of the display device according to claim 8, wherein the backlight has an edge type configuration including a light guide plate having a portion included in the first light-emitting section and a portion included in the second light-emitting section, a plurality of first light-emitting elements included in the first light-emitting section, and a plurality of second light-emitting elements included in the second light-emitting section, and in driving the backlight, the second light-emitting elements are made to turn on in the first turn-on period, and the first light-emitting elements are made to turn on in the second turn-on period.

11. The control method of the display device according to claim 8, wherein the first light-emitting section has an edge type configuration including a first light guide plate and a plurality of first light-emitting elements, the second light-emitting section has an edge type configuration including a second light guide plate and a plurality of second light-emitting elements, independently of the first light-emitting section, and in driving the backlight, the second light-emitting elements are made to turn on in the first turn-on period, and the first light-emitting elements are made to turn on in the second turn-on period.

12. The control method of the display device according to claim 8, wherein the backlight has a direct type configuration including a diffusion plate having a portion included in the first light-emitting section and a portion included in the second light-emitting section, and a plurality of light-emitting elements having a portion included in the first light-emitting section and a remainder included in the second light-emitting section, and in driving the backlight, the light-emitting elements included in the second light-emitting section are made to turn on in the first turn-on period, and the light-emitting elements included in the first light-emitting section are made to turn on in the second turn-on period.

13. The control method of the display device according to claim 8, wherein the display panel is a liquid crystal panel.

14. The control method of the display device according to claim 8, wherein the backlight includes a plurality of light emitting diodes.

* * * * *